(12) United States Patent
Houston

(10) Patent No.: US 6,696,985 B2
(45) Date of Patent: Feb. 24, 2004

(54) REFORMABLE KEYBOARD WITH VARIABLE KEY DESIGN

(75) Inventor: John S. Houston, Hopewell Junction, NY (US)

(73) Assignee: International Business Machines Corporation, Armonk, NY (US)

(*) Notice: Subject to any disclaimer, the term of this patent is extended or adjusted under 35 U.S.C. 154(b) by 379 days.

(21) Appl. No.: 09/841,626

(22) Filed: Apr. 24, 2001

(65) Prior Publication Data

US 2002/0154037 A1 Oct. 24, 2002

(51) Int. Cl.[7] .............................................. H03M 11/00
(52) U.S. Cl. ......................................... 341/21; 341/26
(58) Field of Search .............................. 341/26; 361/21, 361/22, 34; 400/87, 127, 128, 483, 485

(56) References Cited

U.S. PATENT DOCUMENTS

| | | | |
|---|---|---|---|
| 4,121,048 A | 10/1978 | Dev Choudhury | 178/17 C |
| 4,198,539 A | 4/1980 | Pepper, Jr. | 178/18 |
| 4,293,734 A | 10/1981 | Pepper, Jr. | 178/18 |
| 5,661,505 A | 8/1997 | Livits | 345/169 |
| 5,675,329 A | 10/1997 | Barker et al. | 341/22 |
| 5,718,590 A | 2/1998 | Choate | 434/227 |
| 5,790,103 A * | 8/1998 | Willner | 345/168 |
| 5,861,823 A | 1/1999 | Strauch et al. | 341/22 |
| 5,872,561 A * | 2/1999 | Figie et al. | 345/168 |
| 6,094,197 A | 7/2000 | Buxton et al. | 345/358 |
| 6,102,594 A | 8/2000 | Strom | 400/486 |

* cited by examiner

Primary Examiner—Michael Horabik
Assistant Examiner—Hung Dang
(74) Attorney, Agent, or Firm—Floyd Gonzalez

(57) ABSTRACT

Key patterns configured to accommodate the handicaps of the disabled user are imprinted or embossed on a sheet of conformable material. A matrix of sensing circuits for a keyboard are placed under the sheet to detect when and where the sheet is depressed and provides an output to a keyboard controller indicating which portion of the keyboard has been contacted. The keyboard controller relates the position data to the keyboard pattern on the sheet and provides key signals to the computer interface connector of the keyboard that are indistinguishable by a computer system from the QWERTY outputs of a standard keyboard. This enables the disabled user to carry this keyboard from one computer system to another and simply exchange it for the standard keyboard for the computer. Since the keyboard can be configured to accommodate the users handicap, no changes need be made to the operating system or any software of the computer in order to allow the disabled user to use the computer. Furthermore, other users are not required to do anything special to start using the computer system once the standard keyboard is re-installed.

12 Claims, 5 Drawing Sheets

REFORMABLE KEYBOARD WITH VARIABLE KEY DESIGN

RELATED APPLICATION

U.S. patent application, Ser. No.09/841,673, filed on even date herewith and entitled "Interchangeable Keyboard with Self Defining Keys".

FIELD OF THE INVENTION

The present invention relates to the field of computer keyboards and more particularly, to computer keyboards that can be shaped and configured for use by the disabled.

BACKGROUND OF THE INVENTION

The disabled are presented with a number of challenges for performing functions which other users take for granted when it comes to using computer systems. Most people take it for granted that they can walk up to any personal computer and start typing. However, there are a variety of disabilities which make it difficult or impossible for some people to use a standard keyboard. For example, one person may be unable to manage multiple keys such as those used in shift and control sequences while another person may find it difficult to type because of the size of or the spacing between keys. There is not one keyboard layout that will accommodate all handicaps. In many cases, a computer keyboards has to be tailored to the disabilities of the particular individual.

There are many standard keyboard designs with keys that snap in and out of place. Such keyboards could be remapped for the disabled by moving keys and then redefining the keyboard's layout to the computer's operating system. The above identified related application, which is hereby incorporated by reference, discloses how such a standard keyboard design can be configured for use by certain disabled individuals to enable its use in connection with most personal computers without reconfiguring the computer's software to recognize the variation in key position. However, not all disabilities can be accommodated using such a standard keyboard design. For instance, some people with fine motor control difficulties and those suffering from visual problems may require larger keys and/or greater spacing between keys. Meanwhile other individuals who have limited movement of their limbs, fingers and/or hands may find it easier to have keys that are positioned closer together. Furthermore, people with cognitive difficulties or missing limbs or fingers would find it difficult or impossible to use the multiple key sequences of standard type keyboard design.

To design and produce keyboards adapted for each handicapped individual's particular disability would be cost prohibitive using standard keyboard manufacturing processes requiring special molds to form nonconforming keys and other parts of the special keyboard. However even after the special keyboard is in existence, it may not operate properly with a computer because the keyboard will not generate key scan codes that can be correctly identified by the computer without reconfiguring the computer's operating system or application software. This leaves a disabled individual unable to use computer systems to search for a computer expert to specifically reconfigure a computer system to his or her needs. Once reconfigured, that computer system then becomes a problem for others to use with a standard keyboard. Further, the disabled individual is unable to apply skills acquired with the use of the modified computer system to other computer systems without these modifications.

Therefore it is an object of the present invention to provide a keyboard which can be adapted to accommodate the handicaps of a specific user.

It is another object of the present invention to provide a keyboard adapted to the specific handicaps of various users which keyboard can be used with any computer system without requiring special programming or modification of the computer system.

BRIEF DESCRIPTION OF THE INVENTION

In accordance with the present invention, a key pattern configured to accommodate the handicaps of the disabled user is imprinted or embossed on a sheet of compliant material. A matrix of sensing circuits for the keyboard are placed under the material to detect when the material is pressed and provides an output to a keyboard controller indicating which portion of the keyboard has been contacted. The keyboard controller relates the personal data to the keyboard pattern on the compliant material and provides key signals to the computer interface connector of the keyboard that are indistinguishable by a computer system from the output of a standard keyboard. This enables the disabled user to carry this keyboard from one computer system to another and simply exchange it for the standard keyboard for the computer and start typing. Since the keyboard can be configured to accommodate the users handicap, no changes need be made to the operating system or any software of the computer in order to allow the disabled user to use the computer. Furthermore, other users are not required to do anything special to start using the computer system once the standard keyboard is re-installed.

BRIEF DESCRIPTION OF THE DRAWINGS

The present invention and its object features and advantages can be best understood by reading the following description of embodiments thereof while referring to the attached figures of which.

DESCRIPTION OF THE PREFERRED EMBODIMENT

Figure 1:
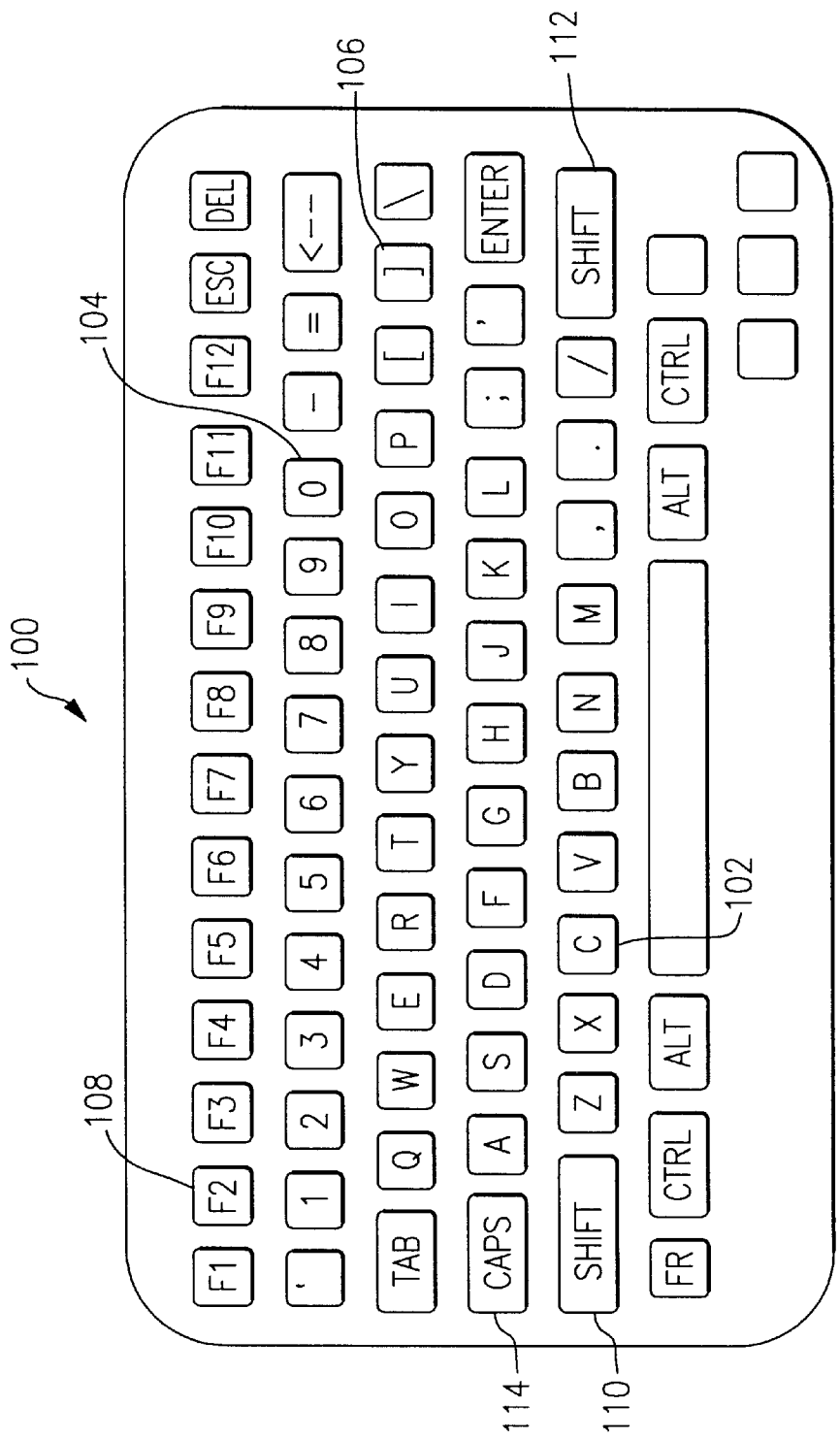
FIG. 1 is a plan view of a standard keyboard with a QWERTY layout.

FIG. 1 shows a keyboard with a standard QWERTY layout. Included in the keyboard 100 are a plurality of well-known alphanumeric control key members 102 having indicia 104 representing the character to be printed. The keyboard further includes a plurality of operating keys 106 and row of customer programmable keys 108. The keyboard includes two shift keys 110 and 112 for use in notifying the processing unit to shift the data of a depressed control key 102 from the lower case to the upper case. The keyboard also includes a caps key 114 which is pushed simultaneously with one of the character keys to print capitals.

Figure 2:
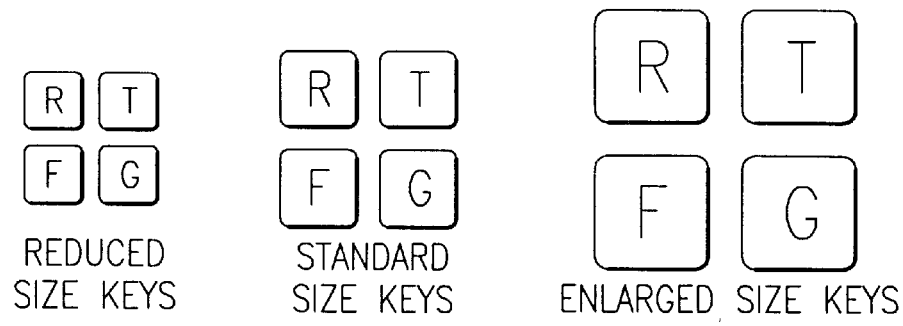
FIG. 2 is a plan view of various key size and key spacing alternations for keyboards for the disabled.
Figure 2:
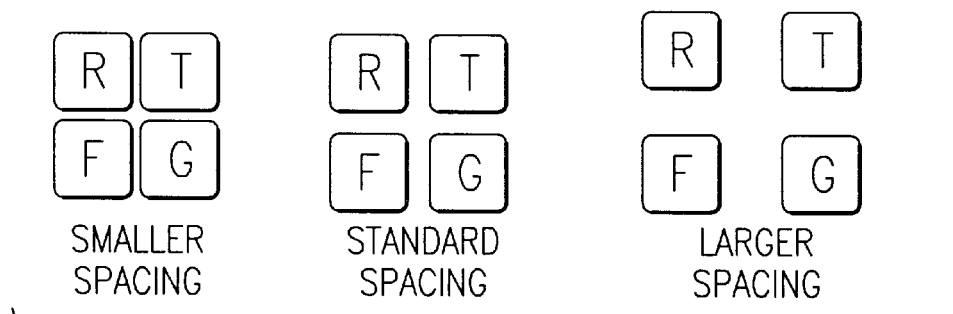

For many disabled users the standard keyboard of FIG. 1 is difficult or impossible to use and a different keyboard configuration would be more suitable. In fact, it would be desirable to have a keyboard structure that could be tailor made for each disabled user which could accommodate a variety of different handicaps. For instance, as pointed out above, certain of the disabled with motor control problems need a keyboard with personalized key size or spacing between the keys. As shown in FIG. 2, a number of different key size/key spacing combinations can be provided. People with motor control difficulties may require larger keys and/or greater spacing between the keys while people with limited motion disabilities may require smaller keys which are closer together.

Figure 3:
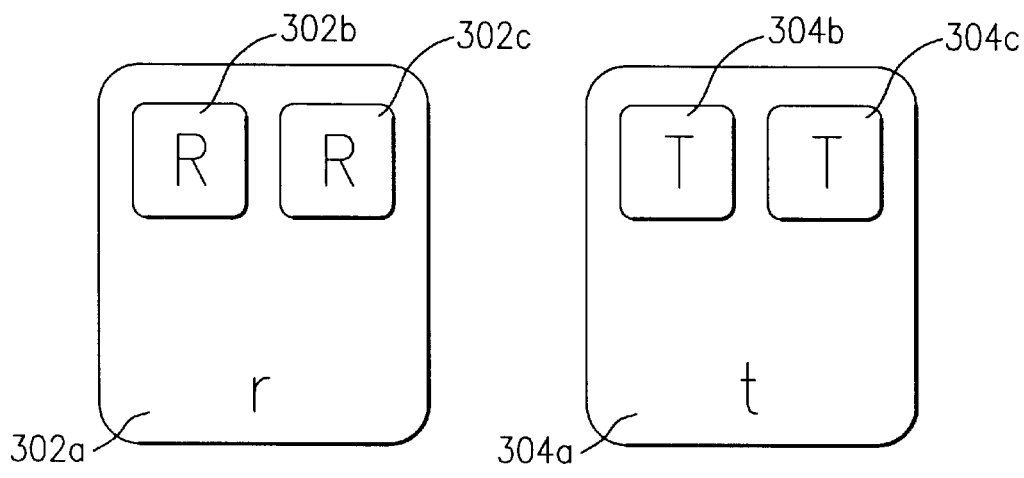
FIG. 3 is a plan view of a multifunction key in accordance with the present invention.

People with limited cognitive ability or missing appendages may require different and/or multifunctional key configurations. FIG. 3 shows multifunctional keys to eliminate the need for simultaneous contact of two different keys to capitalize characters. In accordance with the present invention, each of the character keys 302, 304 are divided into three areas all relating to the same character. Touching any position of 302 or 304 other than the 302b or 302c areas will result in generation of a lower case character being generated. Touching area 302b or 304b will produce an upper case version of the contacted letter area. Contacting areas 302c or 304c will produce a control function. One such control function could be to lock in upper case letter generation when any "c" area of any character is contacted. This enables the larger "a" areas of the character areas to be used by the disabled when capitalizing. To return to generation of lower case characters, the "c" area of any character is contacted producing the lower case version of that character and all subsequent characters until one of the "b" or "c" areas is contacted. While described in terms of characters of the keyboard, the same three area keys can be used in term of the control functions on the keyboard. The key patterns of FIGS. 2 and 3 and other key patterns can be configured to accommodate various disabilities of the users.

Figure 4:
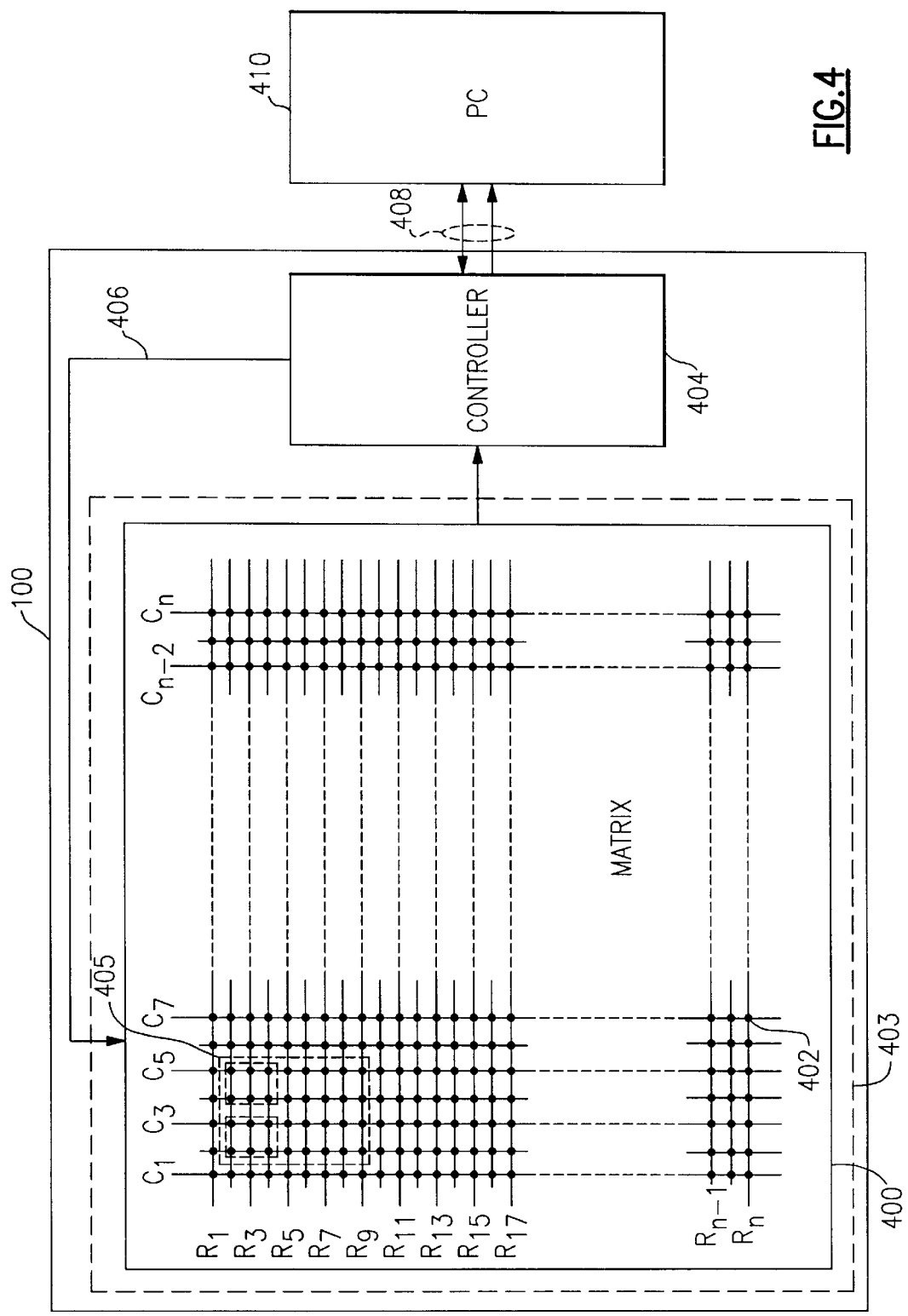
FIG. 4 is a schematic of a switch matrix and controller for use in a keyboard of the present invention.

Referring now to FIG. 4, a rectangular switch matrix unit 400 is utilized in the keyboard 100 for outputting a signal representing the depression of any control key designated as a shift key in the keyboard 100. This matrix unit includes a plurality of input row conductors $R_1$–$R_n$ inclusive and a plurality of output column conductors $C_1$–$C_n$ inclusive. Such row and column conductors have at their intercepts a sensing device 402. Overlying the matrix 402 is a compliant plastic or fabric material 403 (shown here in phantom) containing embossed patterns 405, such as those shown in FIG. 3, at least one for each of the characters in a normal keyboard. Certain of the function keys are also configured in this manner. However, other of the keys can take other forms such as those shown in FIG. 2 so that the keyboard can contain a multiplicity of different types of keys that best meet the needs of the disabled person.

A controller 404 on the keyboard 100 is used to detect a signal called a make code when the overlying fabric or plastic material is depressed and a break code when the finger pressure on the fabric is removed. The controller is used to detect both a make and break code signal to eliminate any false or missed key signal which may occur when the make codes for more than two keys overlap. To produce the make and break code signals, each column conductor $C_1$ to $C_n$ is successively scanned by a strobe pulse in a manner that is well known in the art. The strobe pulse is generated by the controller and provided to the matrix on connection 406. If any section of the fabric on a column has been depressed at the time of the generation of a scanning strobe pulse, for that column, one or more of the row conductors will be energized by the strobe pulse to produce make code pulses, which pulse will be transmitted over the row conductors to the keyboard controller 404. The strobe pulse is applied to each column conductor many times in the period it takes for a human to contact and remove pressure from the fabric. Therefore, a contact pattern extending over a number of columns encompassing different row patterns is produced by the finger of the user. The finger contact pattern can extend over more than one of the printed or embossed areas defined on the fabric. For instance, in attempting to produce a lower case "t" in the pattern of FIG. 3, the user may also contact portions of the areas 304b and 304c, to eliminate ambiguity as to the intention of the user, the controller employs a weighting algorithm attributing greater weight to the row signals occurring in the center of the contact pattern and less to those occurring around the periphery. Thus the weighting algorithm determines what X, Y coordinate positions 402 in the matrix the user intended to contact and the controller knowing the character or function embossed over that area of the matrix 400 determines the intended target of the disabled user. When the controller determines that the lower case "t" was intended, it generates the proper multi-bit scan code for the depressed key of the keyboard interface 408 and provides it to a computer 410 through the keyboard connector 408. This keyboard connector is a standard keyboard connector which, with certain exceptions, will plug into any computer and enable the keyboard providing the proper scan codes to operate with that computer.

The described keyboard matrix can use capacitive switches in which changes in the capacity are used to detect contact with the material 403. Other detecting arrangements can include those used in mechanical keyboards where studs make physical contact to close a connection and a membrane type keyboard in which the sensing switches are contained in membrane layers.

Another form for a keyboard is one that makes use of a smart fabric which embed conductors such as those marketed by Tactex Controls Inc. Such smart fabrics contain a large number of pressure sensing zones made up of pressure sensitive elastomers. Pressure exerted on the elastomer by the user changes the pore size of the elastomer changing its light scattering characteristics which change is detected by a web of fiber optics interconnecting the pressure sensing zones.

Keyboards can also be configured using techniques disclosed in U.S. Pat. Nos. 4,198,539 and 4,293,734 to detect contact to a surface embossed with a key pattern.

Figure 5:
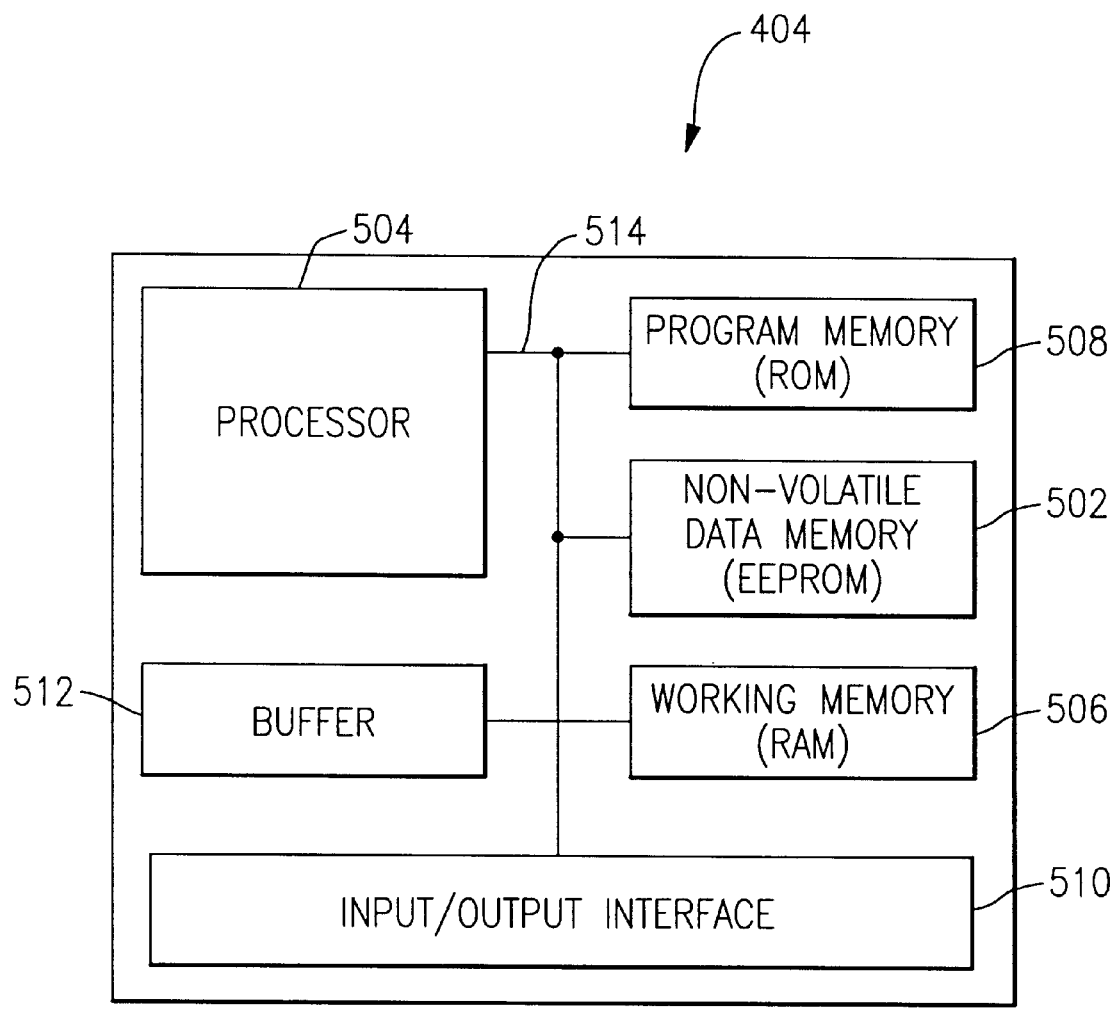
FIG. 5 is a block diagram of the controller of FIG. 4.

As shown in FIG. 5, the controller 404 includes: a microprocessor 504, a volatile working memory 506; a read only memory (ROM) 508 containing the microprocessors operating system and application software; an input/output interface 510 and a buffer 512 used in interfacing the computer 410 and the matrix 400; and a bus 514 connecting the elements of the controller. The keyboard controller 404 also includes a non volatile lookup table memory 502 in which the pressed key areas, identified through use of the weighting algorithm from the x-y positional information provided by the matrix for each of the keyboard keys, are stored along with the corresponding serial multi-bit scan codes to be provided to the CPU 410. When the multi-bit X-Y coordinate data generated by the weighting algorithm matches one stored in the lookup table in non volatile memory, the controller transmits the corresponding scan code to the keyboard-PC interface 508. The scan code is transmitted to the PC 410 through the keyboard buffer for instance to a second keyboard controller located in the PC where they are recognized as the appropriate characters or control codes.

Figure 6:
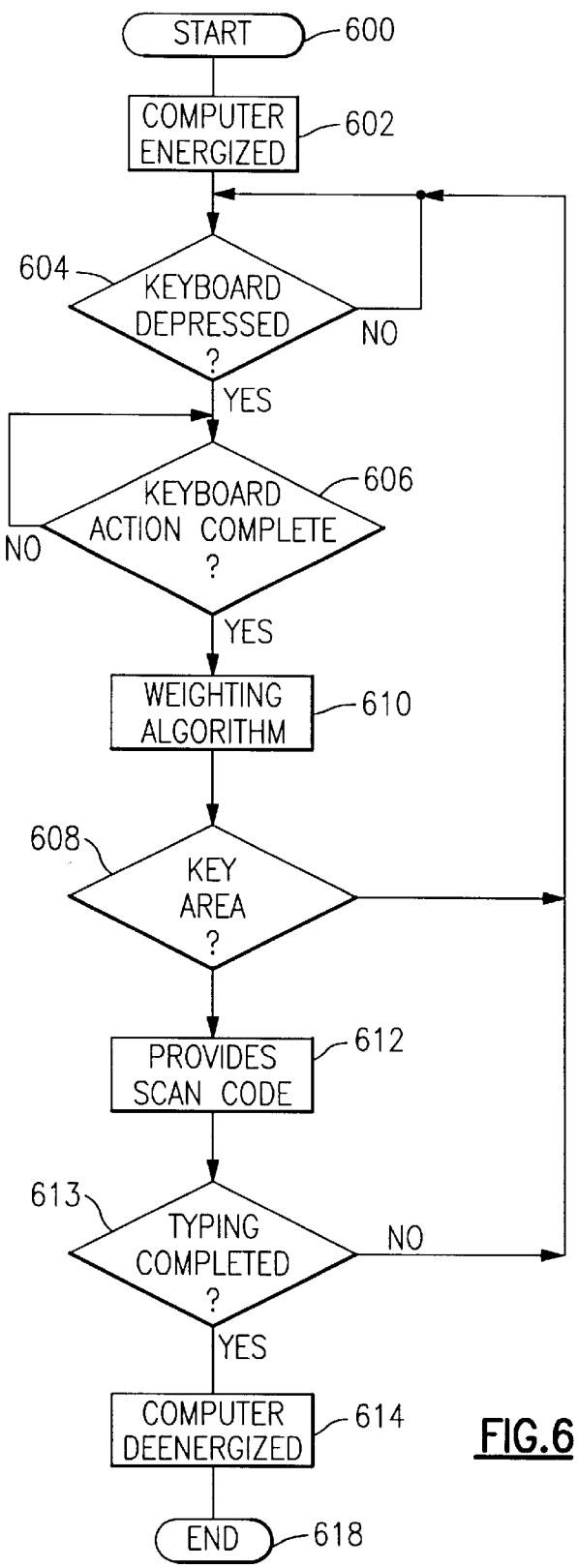
FIG. 6 is a operational flow diagram of the controller in the keyboard.

As shown in FIG. 6, after the computer is turned on (step 600) and the computer is energized (step 602), the keyboard awaits contact from the user (step 604). The controller then determines if there was a proper key stroke occurred (step 606). If it has, a weighting algorithm (step 610) is applied to determine the area intended to be contacted. After the weighting algorithm has identified, the apparent intended key area and the standard QWERTY scan code is selected for the intended key area (step 612). The keyboard then goes back and resets and awaits the next contact area (step 614). After typing is completed, the computer is deenergized (step 616) and the process ends (step 618).

Above we have described two embodiments of the present invention. Of course those skilled in the art may provide modifications of the described embodiments for instance the interface terminal on the keyboard could be USB connector and the on board keyboard controller could be programmed to communicate with the computer through the USB interface. Therefore it is understood that the invention is not limited to the described embodiments but encompasses the spirit and scope of the appended claims.

I claim:

1. Data entry device comprising:
    a keyboard with a surface having a plurality of key area positions embossed thereon shaped or positioned to accommodate the handicap of a disabled user each key area position containing an inscription thereon representing its character or function to be identified by a user;
    a circuit matrix disposed below said keyboard surface said circuit matrix being capable of detecting when any key area position is depressed to produce a multi-bit electrical signal representative of the location of the depressed key area position on the keyboard;
    a standard interface connector to connect the keyboard to a computer to provide key scan codes to the computer;
    a controller for converting the output of the circuit matrix in the depression of a key area to one which is recognizable by the computer so that the key scan code outputs the keyboard provides to the standard interface connector can be interpreted by the computer to correctly identify a selected character or function irrespective of the position or shape of the key areas on the keyboard and weighting algorithm software attributing greater weight to the row signals occurring in the center of the contact pattern of a key and less to those occurring around the periphery of the contact pattern and for providing a multi-bit output identifying the area of the keyboard selected by the user.

2. The data entry device of claim 1 including weighting algorithm software for providing a multi-bit output identifying the area of the keyboard selected by the user.

3. The data entry device of claim 1, wherein the controller includes a look-up table responsive to the multi-bit output of the weighting algorithm to provide a standard scan code recognizable by a computer to the interface connector as a character or function represented an inscription selected by the user.

4. The data entry device of claim 1, wherein at least the character key areas are multi-functional areas enabling typing either upper or lower character types with a single stroke.

5. The data entry device of claim 4 wherein the multi-functional key areas have specific upper character and character control function areas set within a character area.

6. The data entry of claim 5 wherein the controller includes a lookup table responsive to the multi-bit output of the weighting algorithm to provide a standard QWERTY scan code recognizable by a computer to the interface connector as a character or function represented an inscription selected by the user.

7. The data entry device of claim 1, wherein the circuit matrix provides the bits of the multi-bit binary code to the controller as a sequence of parallel outputs each parallel output associated with a column of the matrix.

8. Data entry device comprising:
    a keyboard with a surface having a plurality of key area positions embossed thereon shaped or positioned to accommodate the handicap of a disabled user each key area position containing an inscription thereon representing its character or function to be identified by a user wherein:
        at least the character key areas are multi-functional areas enabling typing either upper or lower character types with a single stroke; and
        wherein the multi-functional key areas have specific upper character and character control function areas set within a character area;
    a circuit matrix disposed below said keyboard surface said circuit matrix being capable of detecting when any key area position is depressed to produce a multi-bit electrical signal representative of the location of the depressed key area position on the keyboard;
    a standard interface connector to connect the keyboard to a computer to provide key scan codes to the computer; and
    a controller for converting the output of the circuit matrix in the depression of a key area to one which is recognizable by the computer so that the key scan code outputs the keyboard provides to the standard interface connector can be interpreted by the computer to correctly identity a selected character or function irrespective of the position or shape of the key areas on the keyboard.

9. The data entry device of claim 8 including weighting algorithm software for providing a multi-bit output identifying the area of the keyboard selected by the user.

10. The data entry device of claim 9, wherein the controller includes a look-up table responsive to the multi-bit output of the weighting algorithm to provide a standard scan code recognizable by a computer to the interface connector as a character or function represented an inscription selected by the user.

11. The data entry device of claim 9, wherein the controller includes a look-up table responsive to the multi-bit output of the weighting algorithm to provide a standard QWERTY scan code recognizable by a computer to the interface connector as a character or function represented an inscription selected by the user.

12. The data entry device of claim 8, wherein the circuit matrix provides the bits of the multi-bit binary code to the controller as a sequence of parallel outputs each parallel output associated with a column of the matrix.

* * * * *